US012531199B2

(12) United States Patent
Naumowicz et al.

(10) Patent No.: US 12,531,199 B2
(45) Date of Patent: Jan. 20, 2026

(54) COMPONENT ASSEMBLIES AND METHODS OF MANUFACTURING COMPONENT ASSEMBLIES THAT INCLUDE A MAGNETIC YOKE ASSEMBLY FOR ELECTROMECHANICAL CONTACTORS AND RELAYS

(71) Applicant: SENSATA TECHNOLOGIES, INC., Attleboro, MA (US)

(72) Inventors: Samuel C. Naumowicz, Carpinteria, CA (US); Fernanda V. Ortega, Santa Barbara, CA (US); Neil Petrarca, Warwick, RI (US); Cory Bousquet, Cranston, RI (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 0 days.

(21) Appl. No.: 17/588,865

(22) Filed: Jan. 31, 2022

(65) Prior Publication Data

US 2023/0145346 A1 May 11, 2023

Related U.S. Application Data

(60) Provisional application No. 63/276,318, filed on Nov. 5, 2021.

(51) Int. Cl.
*H01H 53/02* (2006.01)
*H01H 50/02* (2006.01)
(Continued)

(52) U.S. Cl.
CPC .......... *H01H 50/36* (2013.01); *H01H 50/023* (2013.01); *H01H 50/18* (2013.01); *H01H 50/54* (2013.01); *H01H 53/02* (2013.01)

(58) Field of Classification Search
CPC ............................... H01H 50/36; H01H 53/02
(Continued)

(56) References Cited

U.S. PATENT DOCUMENTS 3,887,888 A * 6/1975 Bayles .................... H01H 1/50 335/16
4,513,270 A * 4/1985 Belbel ................. H01H 77/101 335/16
(Continued)

FOREIGN PATENT DOCUMENTS

DE 102021114675.5 A 6/2021
EP 3139396 A1 3/2017
(Continued)

OTHER PUBLICATIONS

Extended European Search Report, EP22159299.1, Aug. 17, 2022, 7 pages.
(Continued)

*Primary Examiner* — Alexander Talpalatski
(74) *Attorney, Agent, or Firm* — Mark H. Williams

(57) ABSTRACT

Component assemblies and methods of manufacturing component assemblies that include a magnetic yoke assembly for electromechanical contactors and relays are disclosed. In a particular embodiment, a component assembly that includes a magnetic yoke assembly for electromechanical contactors and relays is described. In this embodiment, the magnetic yoke assembly includes a movable contact and a ferromagnetic upper yoke mounted in above the moveable contact and separate from the moveable contact. The magnetic yoke assembly also includes a ferromagnetic lower yoke mounted under the moveable contact.

13 Claims, 19 Drawing Sheets

(51) Int. Cl.

| | |
|---|---|
| ***H01H 50/18*** | (2006.01) |
| ***H01H 50/36*** | (2006.01) |
| ***H01H 50/54*** | (2006.01) |

(58) Field of Classification Search

USPC .................................................. 335/147, 195

See application file for complete search history.

(56) References Cited

U.S. PATENT DOCUMENTS

| | | | | |
|---|---|---|---|---|
| 4,593,260 | A * | 6/1986 | Guero | H01H 77/101 335/147 |
| 8,138,863 | B2 * | 3/2012 | Tanaka | H01H 50/38 335/131 |
| 9,613,771 | B2 | 4/2017 | Lim | |
| 2016/0155592 | A1 | 6/2016 | Ito et al. | |
| 2016/0196944 | A1 * | 7/2016 | Ionescu | H01H 71/00 335/18 |
| 2021/0391123 | A1 | 12/2021 | Naumowicz et al. | |
| 2024/0105409 | A1 | 3/2024 | Schoechert et al. | |

FOREIGN PATENT DOCUMENTS

| | | | |
|---|---|---|---|
| EP | 3846194 | A1 | 7/2021 |
| EP | 3979289 | A1 | 4/2022 |
| EP | 4012741 | A1 | 6/2022 |
| EP | 4024429 | A1 | 7/2022 |
| WO | 2020241969 | A1 | 12/2020 |
| WO | 2021022822 | A1 | 2/2021 |

OTHER PUBLICATIONS

International Search Report and Written Opinion, PCT/US2022/042364, Apr. 13, 2023, 10 pages.

* cited by examiner

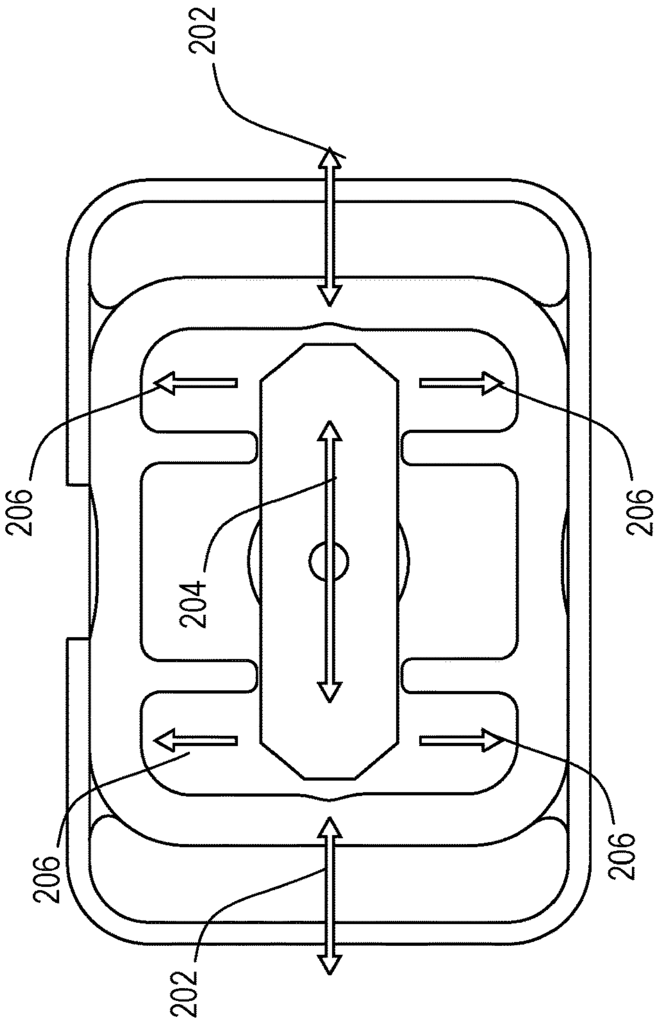
FIG. 2
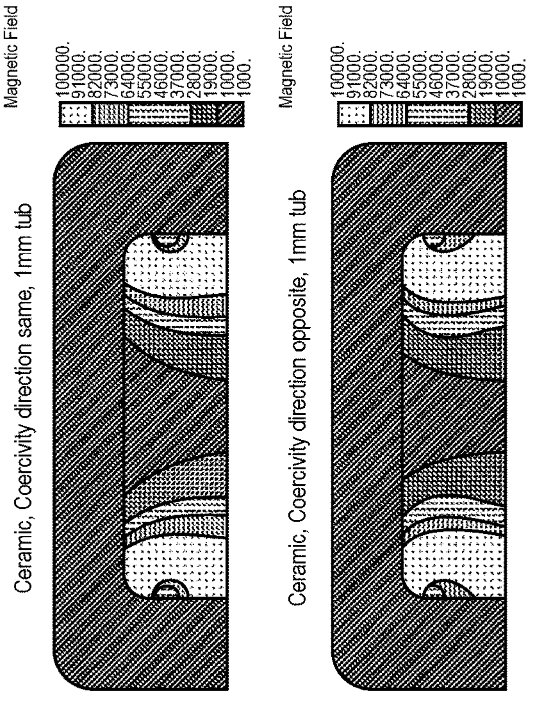

COMPONENT ASSEMBLIES AND METHODS OF MANUFACTURING COMPONENT ASSEMBLIES THAT INCLUDE A MAGNETIC YOKE ASSEMBLY FOR ELECTROMECHANICAL CONTACTORS AND RELAYS

CROSS-REFERENCE TO RELATED APPLICATIONS

This application claims priority to U.S. Provisional Application No. 63/276,318, filed Nov. 5, 2021, which is hereby incorporated by reference in its entirety.

FIELD OF THE TECHNOLOGY

The subject disclosure relates to component assemblies and methods of manufacturing component assemblies that include a magnetic yoke assembly for electromechanical contactors and relays.

BACKGROUND

Electromechanical switching devices, such as contactors and relays, are designed to carry certain amount of electrical current for certain periods of time. Existing designs struggle to perform during very high current, short duration events commonly called short-circuits, which can cause the internal electrical contacts to separate destructively (commonly called contact levitation). One solution to this problem involves the use of ferromagnetic components, known as yokes or armatures, configured around the electrical contacts such that the short-circuit current induces a magnetic field and an attractive "anti-levitation" force between the ferromagnetic components that prevents the electrical contacts from separating. Existing applications using this approach mount the yoke surrounding the moveable electrical contact onto the moving assembly, increasing the mass of the moving assembly. This reduces operation speed and negatively impacts contactor/relay switching performance.

SUMMARY

Component assemblies and methods of manufacturing component assemblies that include a magnetic yoke assembly for electromechanical contactors and relays are disclosed. In a particular embodiment, a component assembly that includes a magnetic yoke assembly for electromechanical contactors and relays is described. In this embodiment, the magnetic yoke assembly includes a movable contact and a ferromagnetic upper yoke mounted above the moveable contact and separate from the moveable contact. The magnetic yoke assembly also includes a ferromagnetic lower yoke mounted under the moveable contact.

In another embodiment, a method of manufacturing a component assembly that includes a magnetic yoke assembly for electromechanical contactors and relays is described. In this embodiment, the method includes mounting a ferromagnetic upper yoke above a moveable contact and separate from the moveable contact. The method also includes mounting a ferromagnetic lower yoke under the moveable contact.

As will be explained in further detail below, by mounting the magnetic yoke separately from a moveable contact in a magnetic yoke assembly, the mass of a moveable contact assembly is reduced, which improves the operational speed and performance of a component assembly over component assemblies that include previously known designs of magnetic yoke assemblies.

BRIEF DESCRIPTION OF THE DRAWINGS

FIG. 2 is a diagram illustrating current flow within an example electromechanical contactor with a magnetic yoke assembly according to at least one embodiment of the present disclosure.

DETAILED DESCRIPTION

Figure 1:
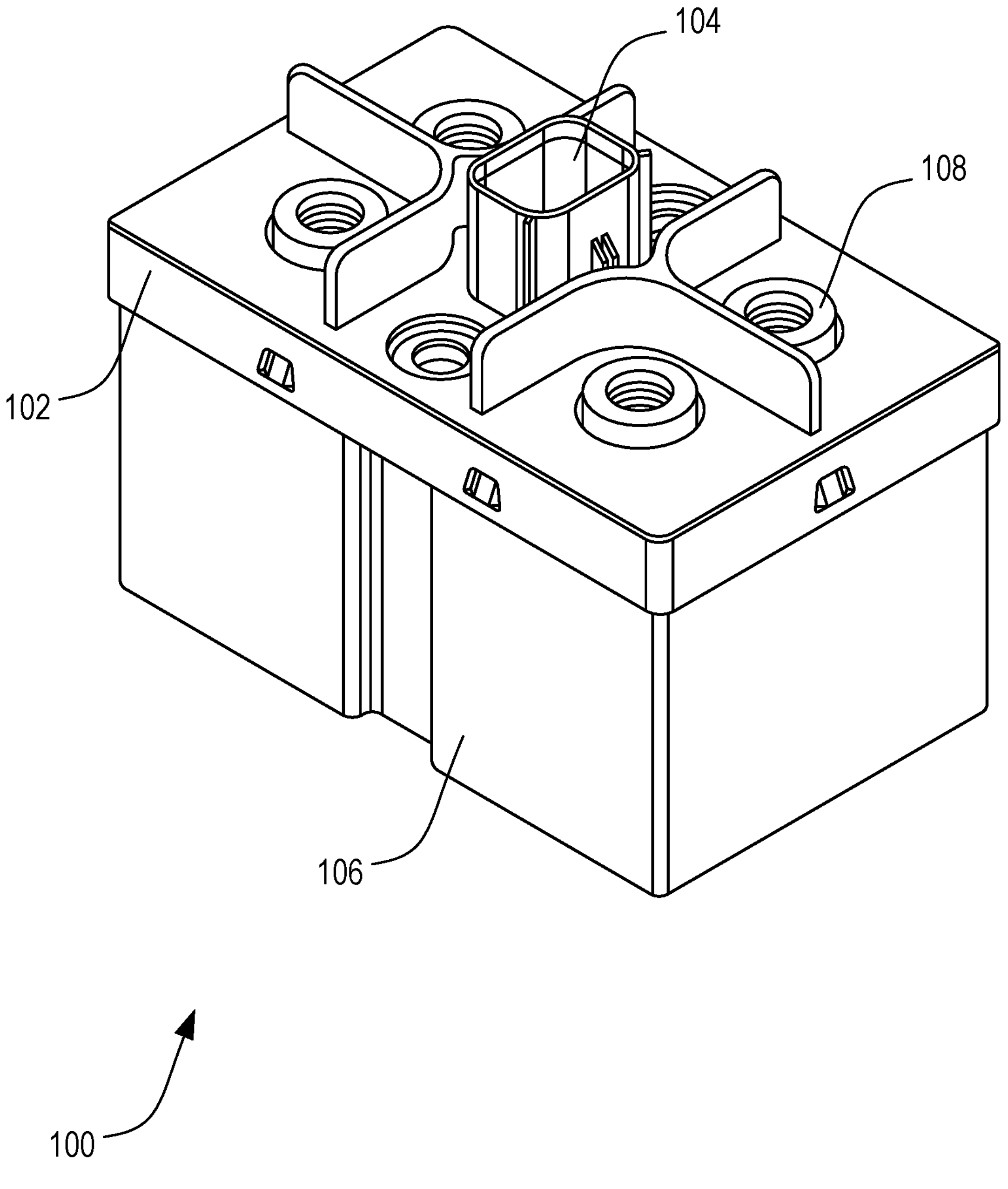
FIG. 1 is a diagram of an example electromechanical contactor with a magnetic yoke assembly according to at least one embodiment of the present disclosure.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

In a particular embodiment, the use of ferromagnetic components to improve short-circuit performance in contactors involves mounting a u-shaped ferromagnetic yoke that surrounds the moveable contact onto the moving assembly.

In a particular embodiment, the u-shaped yoke can also be chamfered to optimize the anti-levitation force. This allows further reduction of the lower yoke's mass.

According to embodiments of the present disclosure, a u-shaped ferromagnetic yoke is mounted above a moveable current-carrying contact, under which is a second ferromagnetic component. During a high current event (ex. short-circuits), the inverted yoke magnetically attracts the second ferromagnetic component under the moveable contact, increasing contact force and maintaining continuity. According to one or more embodiments of the present disclosure, the yoke is mounted separately from the moveable contact, thus reducing mass on the moving assembly, and thereby increasing mechanism operating speed in comparison to similar designs. In addition, mounting the yoke separately from the moveable contact allows for short-circuit performance improvement without the negative impact to switching performance.

In a particular embodiment, a magnetic yoke for improved switching performance in electromechanical contactors and relays includes bidirectional performance, improved corrosion resistance (CR) by removing plastic and coils from a sealed hermetic chamber. The yoke also includes modular performance—these requirements drive models used. Such requirements include make/break performance, levitation performance, isolated moveable, and aux normally open (NO) or normally closed (NC). The modular package includes housing, connectors, and mounting.

Figure 5:
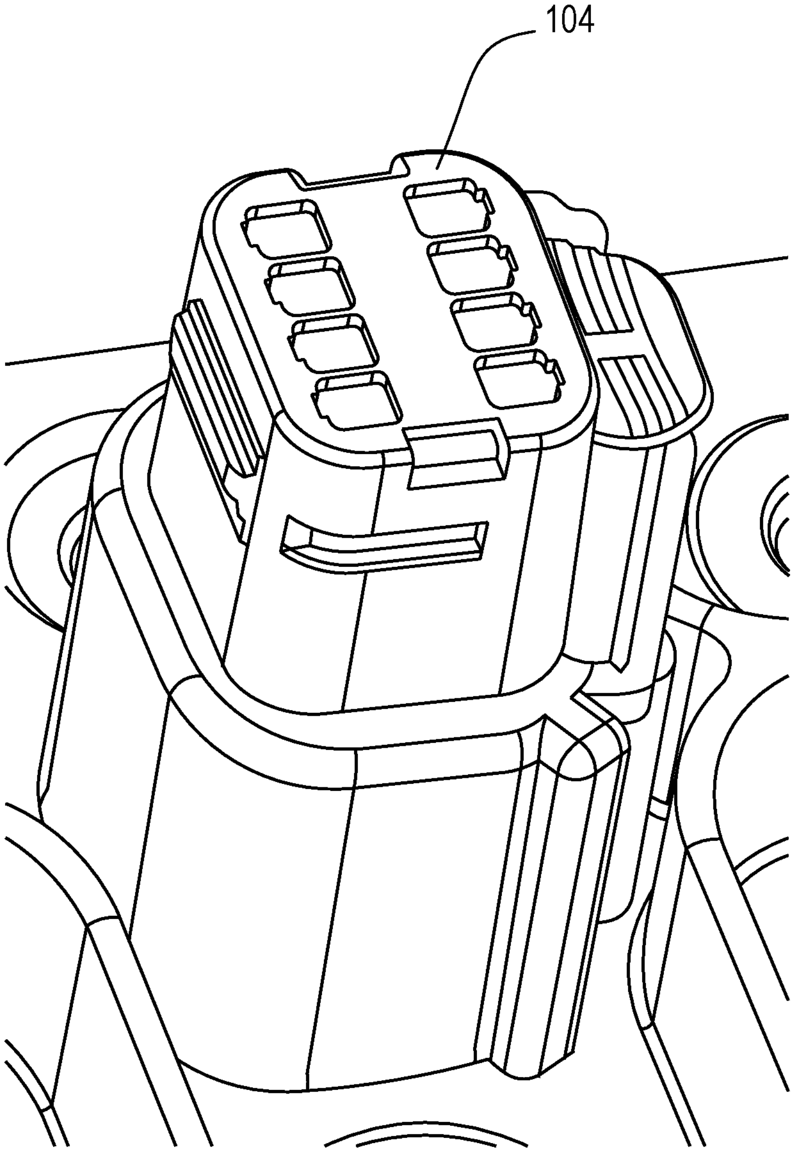
FIG. 5 is a diagram of an example Molex connector of an example electromechanical contactor with a magnetic yoke assembly according to at least one embodiment of the present disclosure.

For further explanation, FIG. 1 illustrates an example embodiment of an electromechanical contactor 100 according to at least one embodiment of the present disclosure. The contactor 100 includes an upper housing 102 and lower housing 106 that encloses the internal components of the contactor 100, including the magnetic yoke assembly described in further detail below. The contactor 100 also includes a connector 104. In some embodiments, the connector 104 includes a Molex connector 104 (see, e.g., FIG. 5). In other embodiments, the connector 104 includes solder pins, flying leads, or other types of connectors as can be appreciated. The contactor 100 also includes one or more terminals 108 for routing current through a moveable contact of a magnetic yoke assembly.

Figure 3:
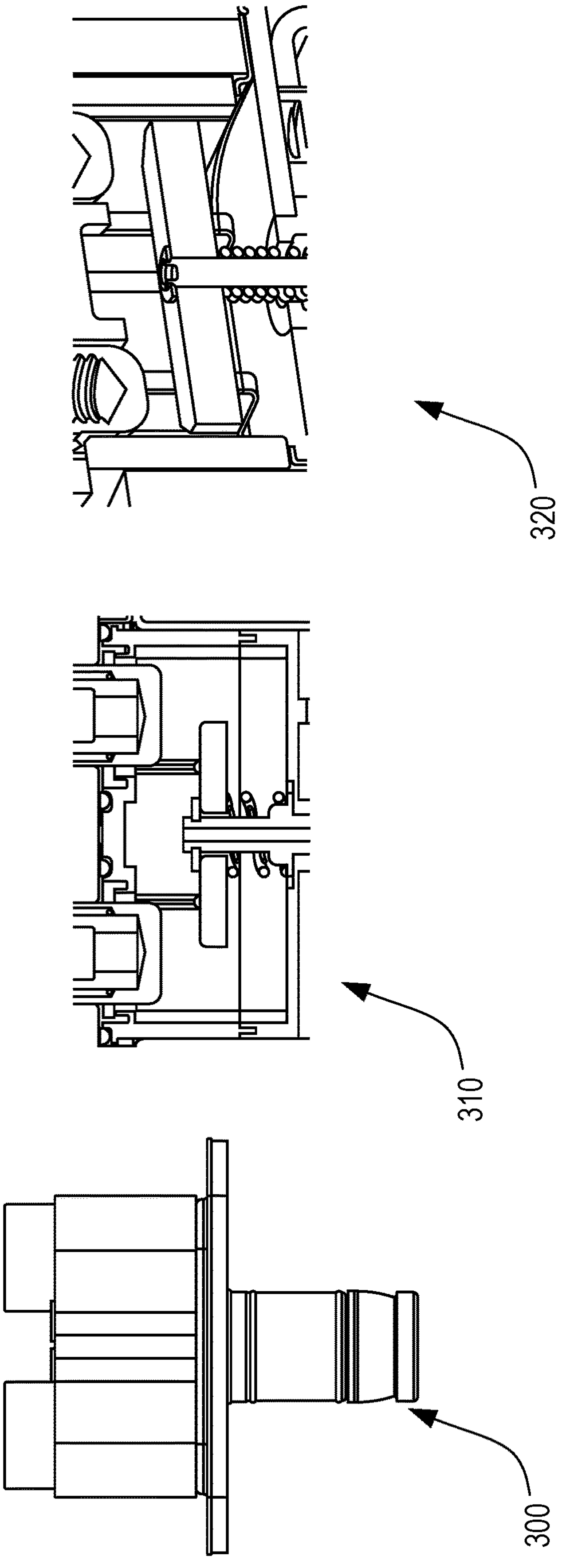
FIG. 3 is a diagram of various views of an example hermetic assembly of an electromechanical contactor with a magnetic yoke assembly according to at least one embodiment of the present disclosure.

With respect to the bidirectional performance, FIG. 2 illustrates that magnetic poles are in line with current direction, with non-sensitive installation. In the example of FIG. 2, arrows 202 show a magnetic pole direction. Arrows 204 show a direction of a flow of current. Arrows 206 shows an arc direction pending current flow. FIG. 3 shows an example hermetic assembly 300. In contrast to solutions for hermetic assemblies shown in the cross-sectional view 310, plastic has been completely removed from the sealed chamber of the hermetic assembly 300 to reduce CR as shown in the cross-sectional view 320. For isolated moveable and NC aux options, minimal plastic is used. In some implementations, the coil is removed from the hermetic chamber. This results in a chamber that is cleaner and has less moisture and contaminates. In this embodiment, changes in size/pin location do not impact the sealed design.

Figure 4:
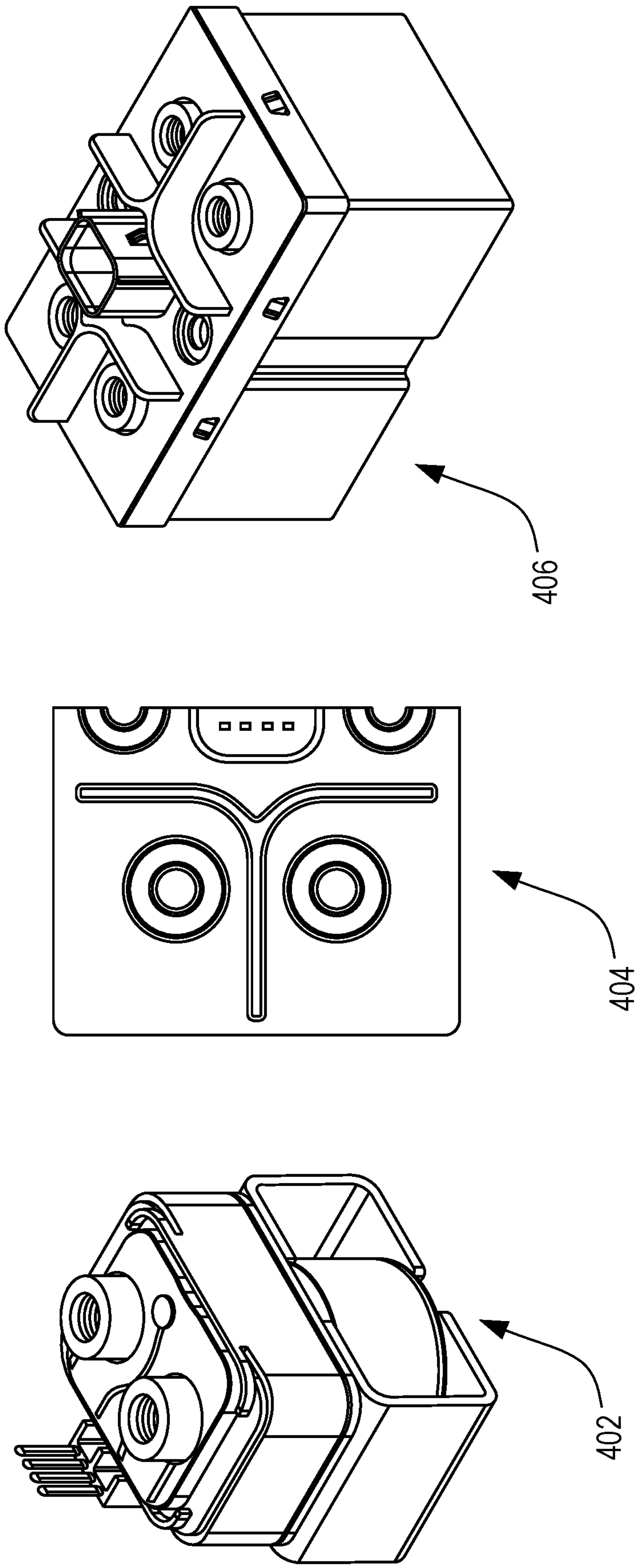
FIG. 4 is a diagram of various views of an example electromechanical contactor with a magnetic yoke assembly according to at least one embodiment of the present disclosure.
Figure 6:
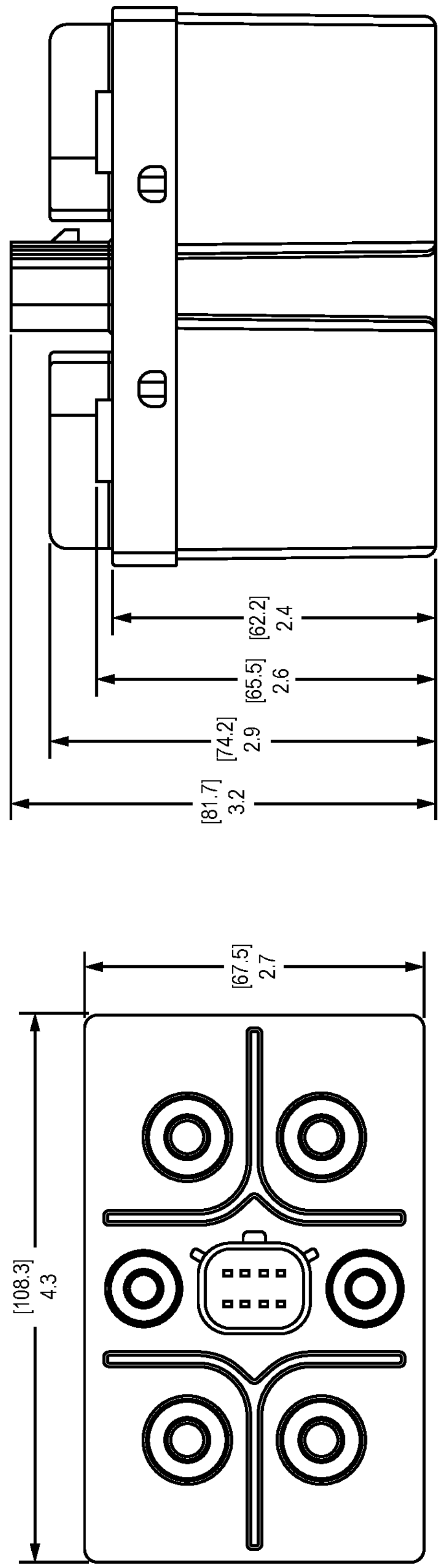
FIG. 6 is a diagram illustrating dimensions of an example electromechanical contactor with a magnetic yoke assembly according to at least one embodiment of the present disclosure.
Figure 7:
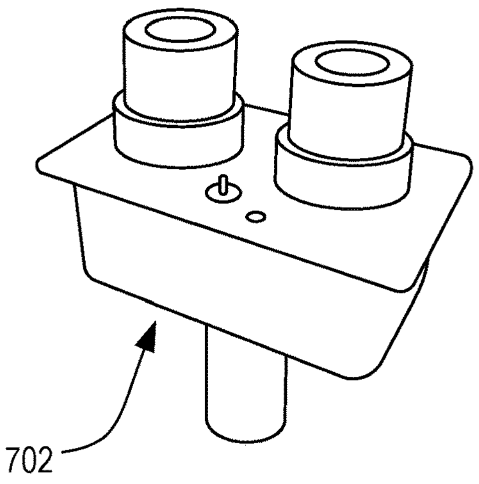
FIG. 7 is a diagram illustrating a view of an example external view of an arc envelope according to at least one embodiment of the present disclosure.
Figure 8:
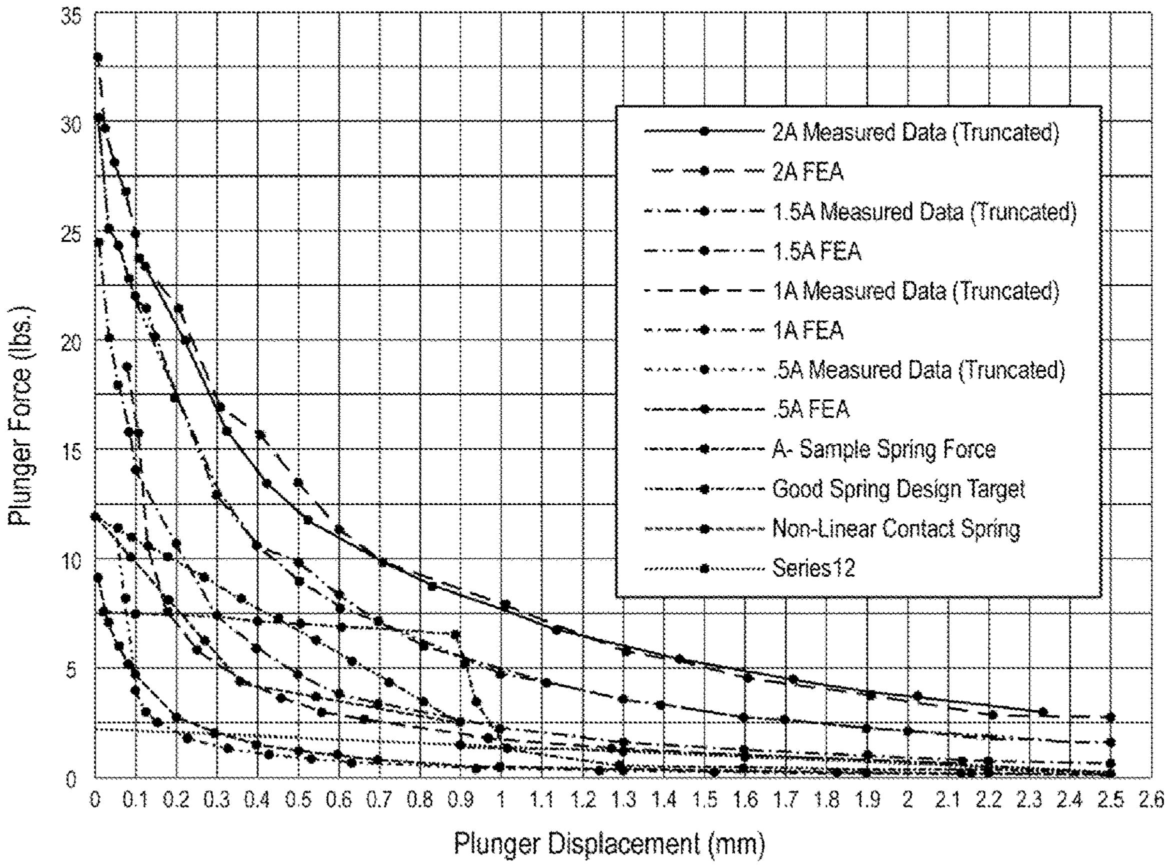
FIG. 8 is a chart of performance metrics for force on an actuator plunger based on a plunger position in the coil according to at least one embodiment of the present disclosure.

As is illustrated in the example contactor 402 of FIG. 4, no housing is required according to at least one embodiment of the present disclosure. In some embodiments, a one-up (see contactor 404) or two-up design (see contactor 406) is used. In some embodiments, the yoke is mounted with a space efficient, top-down install. In some embodiments, the housing can be modified to fit custom mounting schemes with changes to the dimensional envelope as shown in the example dimensions shown in FIG. 6. FIG. 7 shows external views of an exterior view 702 of a contactor's arc envelope according to some embodiments of the present disclosure. FIG. 8 shows a flow chart of performance metrics for the force on an actuator plunger based on a plunger position in the coil described herein according to various embodiments.

Figure 9:
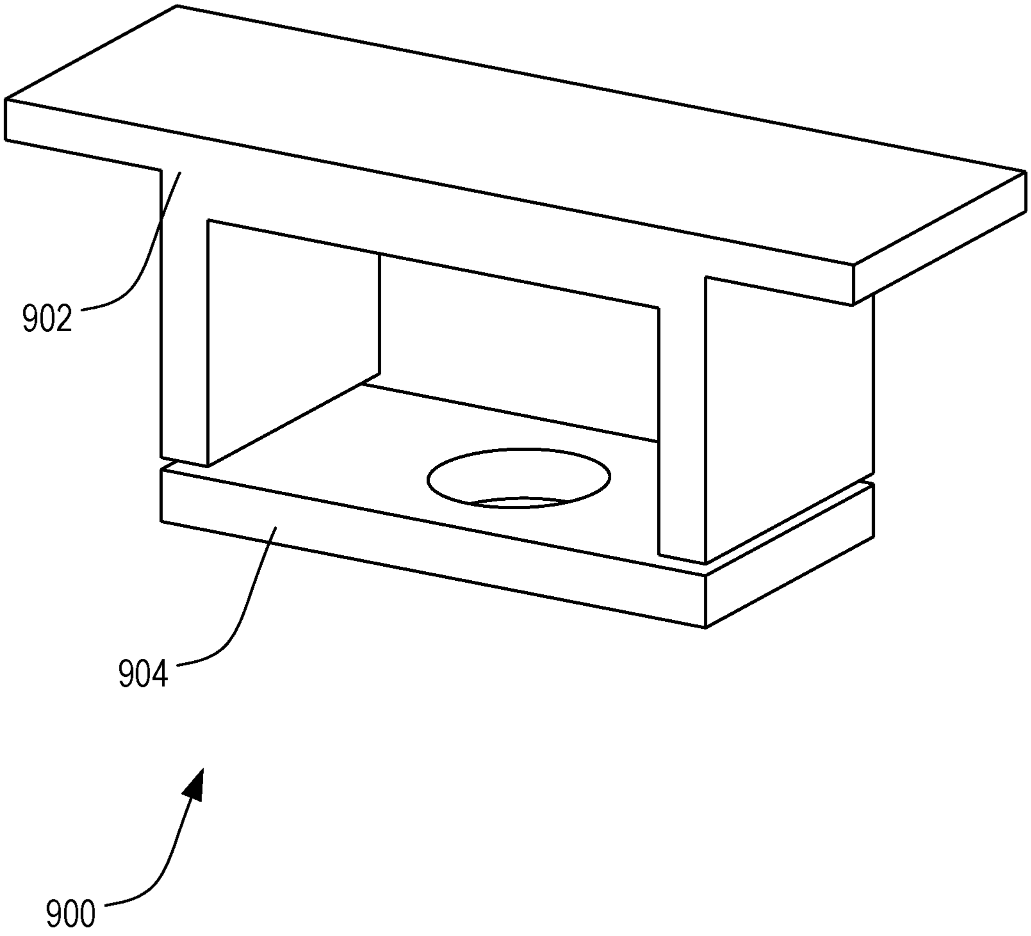
FIG. 9 is a diagram illustrating a view of a magnetic yoke assembly for electromechanical contactors and relays according to at least one embodiment of the present disclosure.

FIG. 9 shows the main components of an example yoke 900 according to some embodiments of the present disclosure. The yoke 900 includes a ferromagnetic upper yoke 902 and a ferromagnetic lower yoke 904. The ferromagnetic upper yoke 902 is an upper u-shaped yoke while the ferromagnetic lower yoke 904 is a flat yoke. In some embodiments, the ferromagnetic lower yoke 904 includes an opening through which various components can pass. As an example, a plunger shaft of an actuator can pass through the opening.

Figure 10:
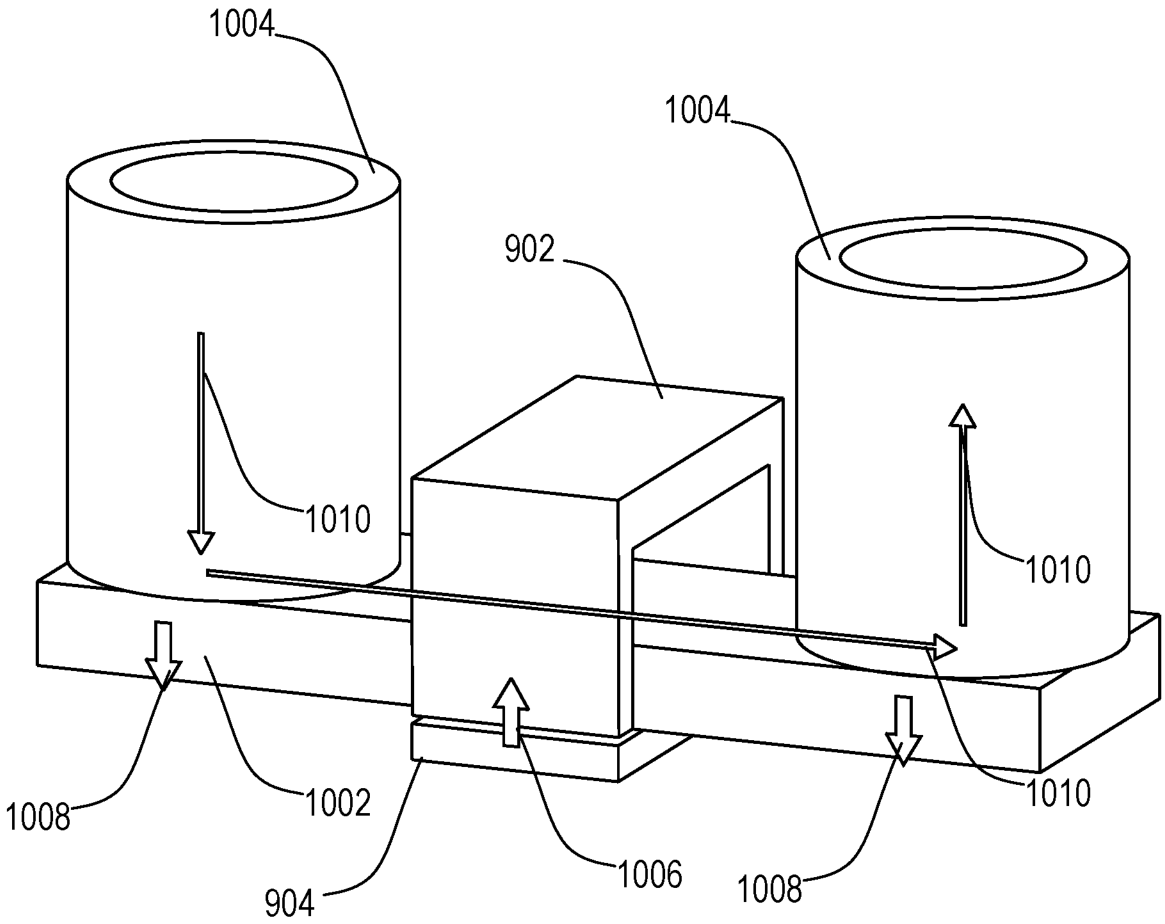
FIG. 10 is a diagram illustrating a view of a magnetic yoke assembly for electromechanical contactors and relays according to at least one embodiment of the present disclosure.

FIG. 10 shows the yoke 900 mounted around a moveable contact 1002 according to some embodiments of the present disclosure. As shown in FIG. 10, the ferromagnetic upper yoke 902 and ferromagnetic lower yoke 904 wrap around movable contact 1002 to help prevent levitation. The moveable contact 1002 is in contact with terminals 1004. In this example embodiment, arrow 1006 shows a direction of magnetic force, arrows 1008 show a direction of levitation force, and arrows 1010 show a direction of current flow. During a high current event, the ferromagnetic upper yoke 902 is drawn to the ferromagnetic lower yoke 904 by magnetic force.

Figure 11:
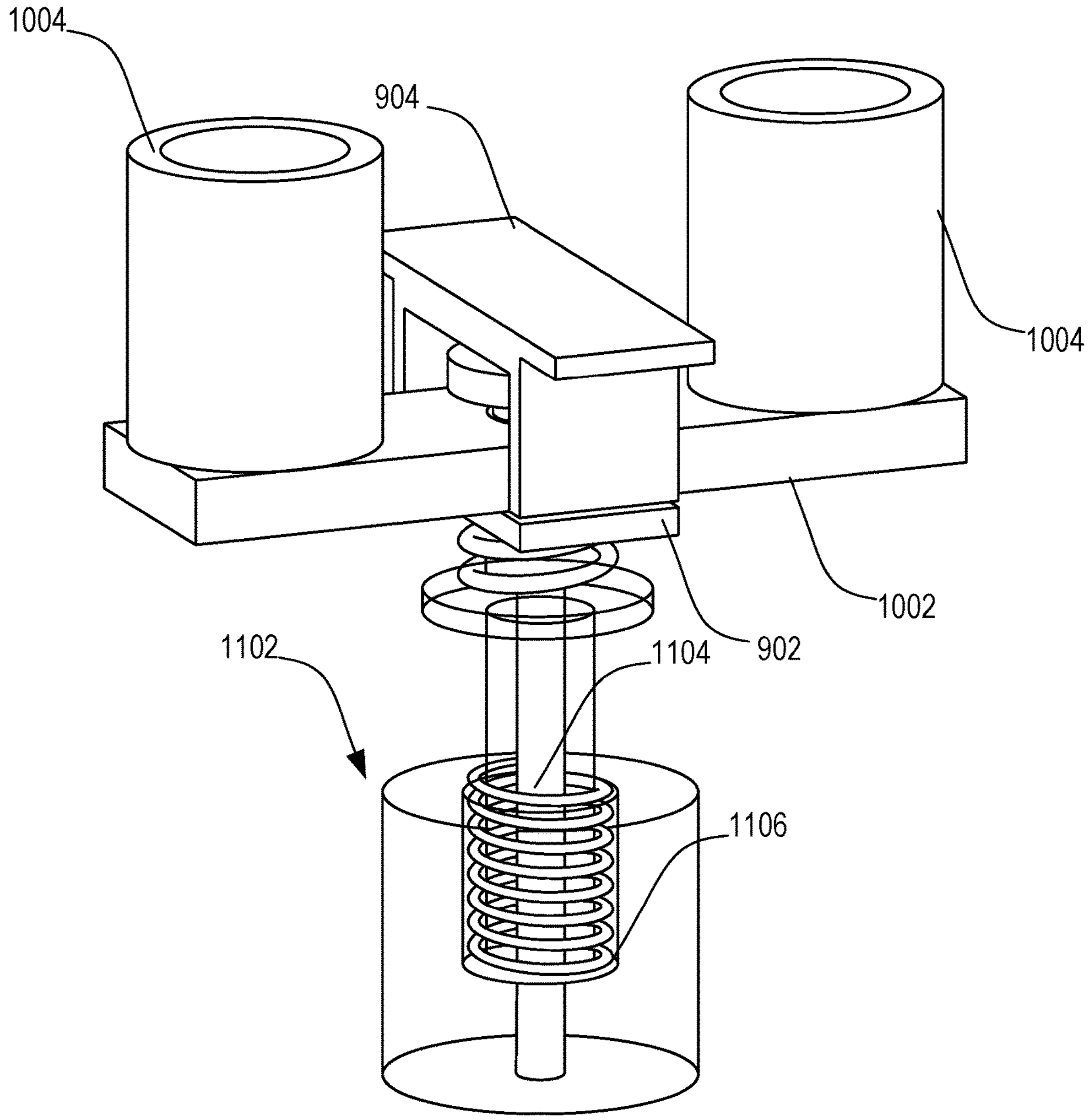
FIG. 11 is a diagram illustrating a view of a contact actuator of an example electromechanical contactor with a magnetic yoke assembly according to at least one embodiment of the present disclosure.

FIG. 11 shows an example view of a contact actuator assembly with yokes included according to some embodiments of the present disclosure. As shown in FIG. 11, the ferromagnetic lower yoke 904 contacts the actuator 1102. The ferromagnetic lower yoke 904 supports the moveable contact 1002 which is framed by the ferromagnetic upper yoke 902. The actuator assembly 1102 includes a plunger shaft 1104 applied force by a plunger spring 1106. In some embodiments, the plunger shaft 1104 passes through an opening in the ferromagnetic lower yoke 902. In some embodiments, the plunger shaft 1104 passes through an opening in the moveable contact 1002. Moreover, in some embodiments, when the plunger shaft 1104 is in an actuated state, the moveable contact 1002 conductively links the terminals 1004 to allow current to pass through the terminals 1004 via the moveable contact 1002.

Figure 12:
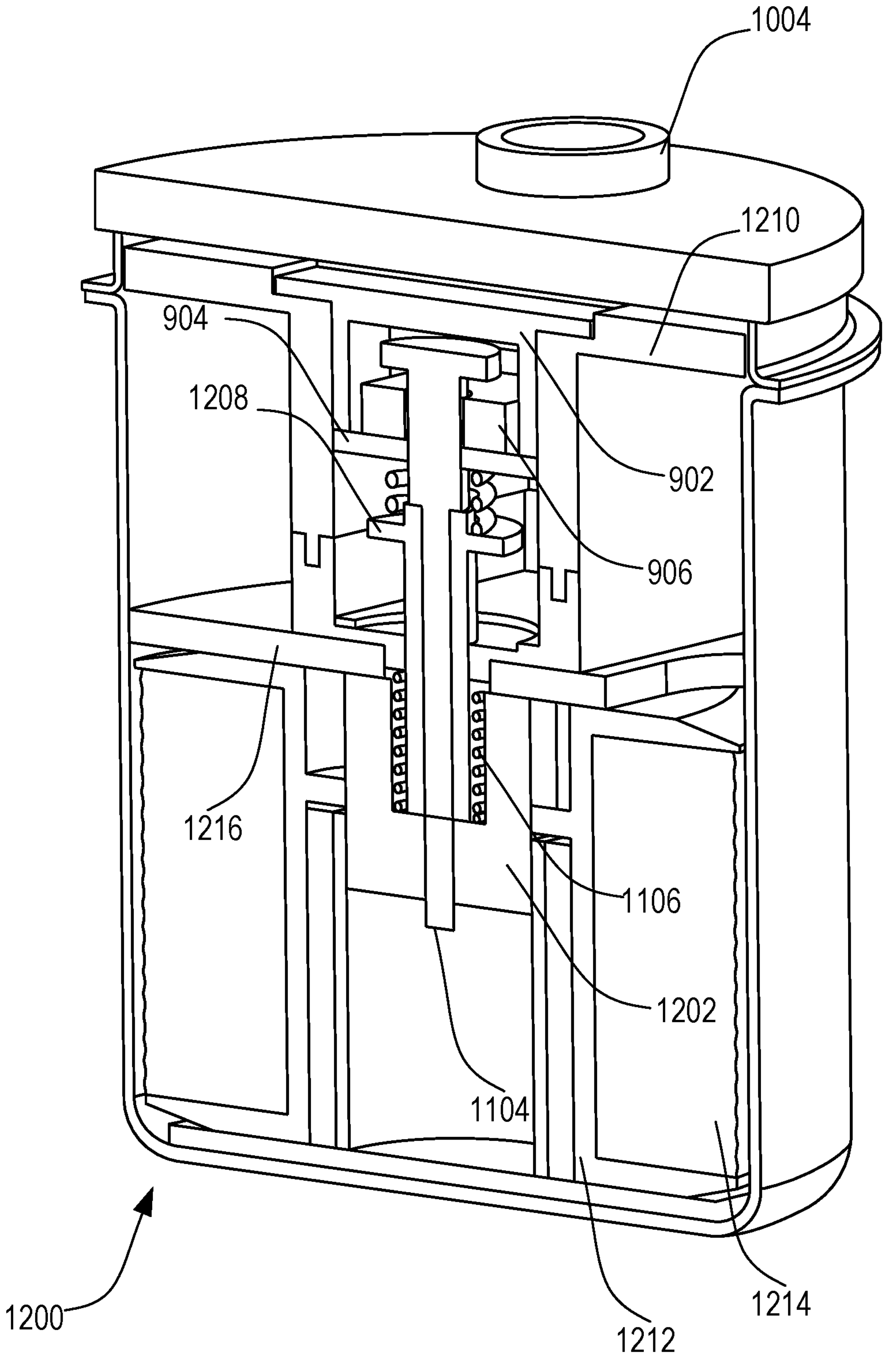
FIG. 12 is a diagram illustrating a cross-sectional view of an example electromechanical contactor with a magnetic yoke assembly according to at least one embodiment of the present disclosure.

FIG. 12 shows a cross sectional view of a contactor 1200 with yoke design features according to some embodiments of the present disclosure. The contactor 1200 includes an actuator assembly including a plunger 1202 and plunger shaft 1104. A plunger spring 1106 surrounds the plunger shaft 1104 and is housed in an inner chamber of the plunger 1202. A standoff 1208 elevates the plunger shaft 1104.

The plunger shaft 1104 passes through an opening in a moveable contact 1002. The moveable contact 906 passes through a yoke including a ferromagnetic upper yoke 902 and a ferromagnetic lower yoke 904. The yoke and actuator components are housed within an arc envelope 1210, such as a ceramic arc envelope. A terminal 1004 extends from the top of the contactor 1200. A lower portion of the contactor 1200 includes a coil bobbin 1212 housing the plunger 1202. Coil wire 1214 surrounds the coil bobbin 1212. The lower portion of the contactor 1200 is defined by a top core 1216 separator.

Figure 13:
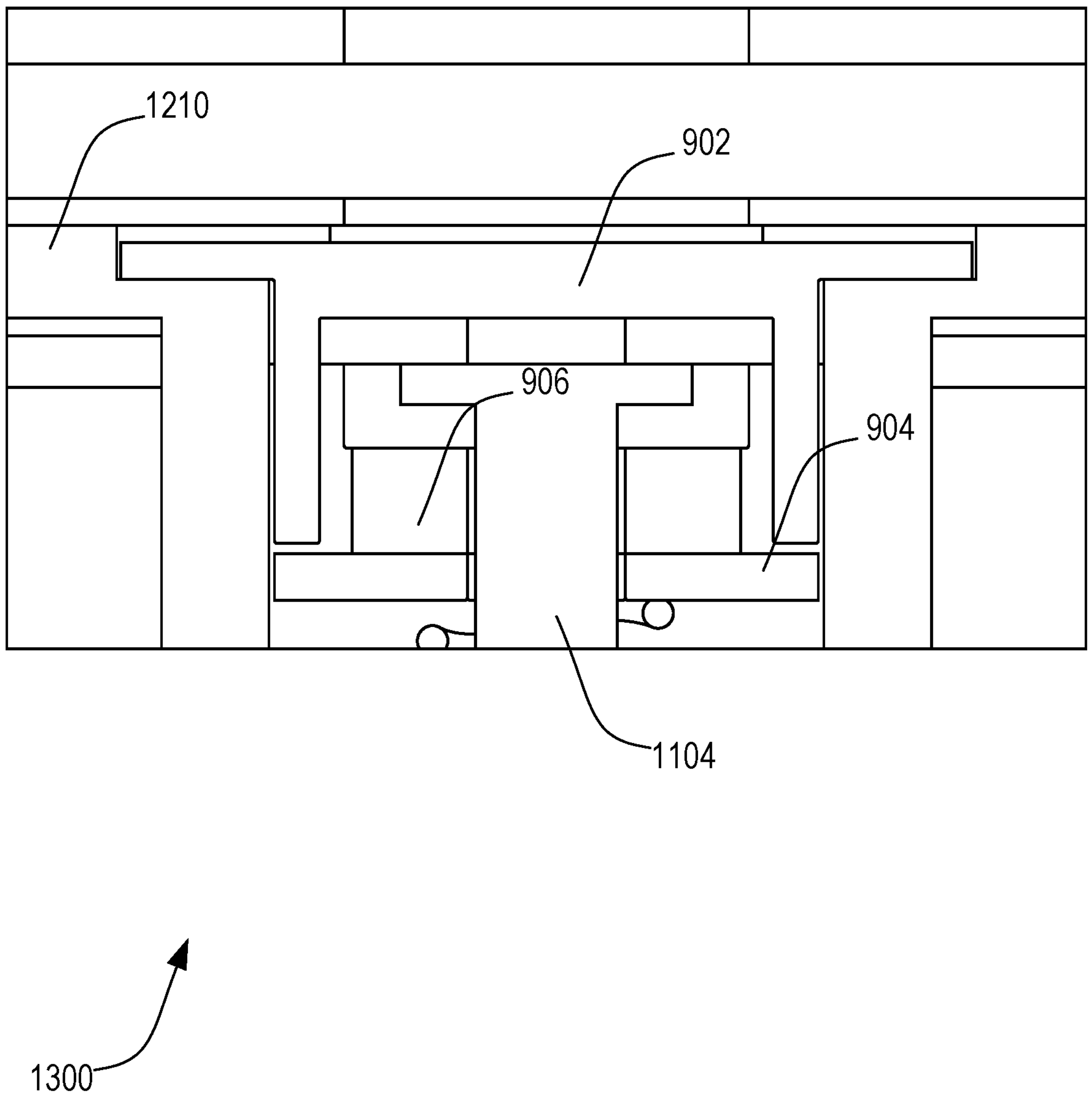
FIG. 13 is a diagram illustrating a side cross-sectional view of an example electromechanical contactor with a magnetic yoke assembly according to at least one embodiment of the present disclosure.

FIG. 13 shows an example contactor 1300 side cross-sectional view according to some embodiments of the present disclosure. As shown in the example side cross-sectional view, the contactor 1300 includes an arc envelope 1210 that supports the ferromagnetic upper yoke 902. The ferromagnetic lower yoke 904 is attached to an actuator. The moveable contact 906 rests on the ferromagnetic lower yoke 904. A plunger shaft 1104 passes through an opening in the moveable contact 1002.

Figure 14:
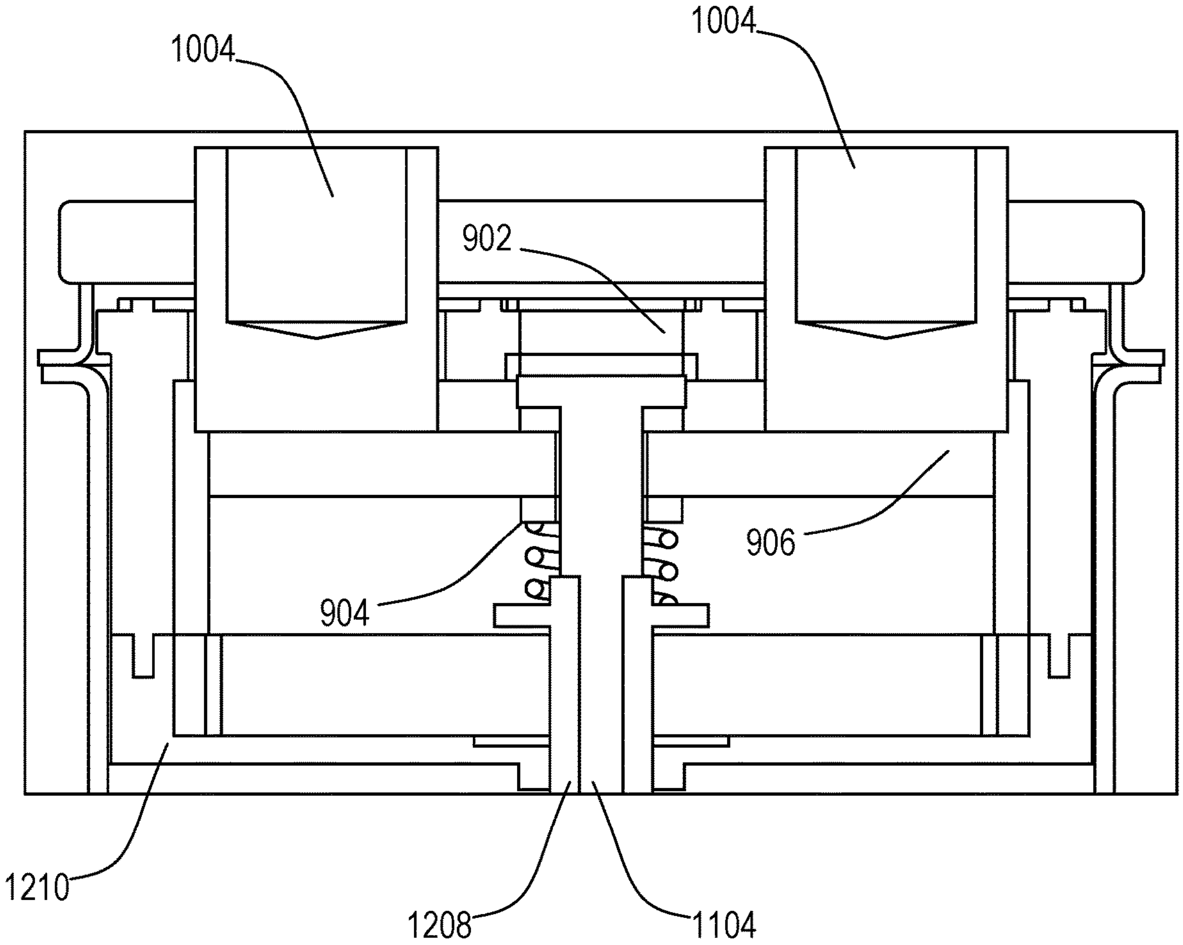
FIG. 14 is a diagram illustrating a front side cross-sectional view of an example electromechanical contactor with a magnetic yoke assembly according to at least one embodiment of the present disclosure.

FIG. 14 shows an example contactor 1400 front cross-sectional view according to some embodiments of the present disclosure. As shown in FIG. 14, a plunger shaft 1104 passes through and is elevated by a standoff 1208. The plunger shaft 1104 also passes through an opening in the ferromagnetic lower yoke 904 and the moveable contact 1002. The ferromagnetic upper yoke 902 is supported by an arc envelope 1210. Terminals 1004 contact the moveable contact 1002, allowing for current to pass through the terminals 1004 via the moveable contact 1002.

Figure 15:
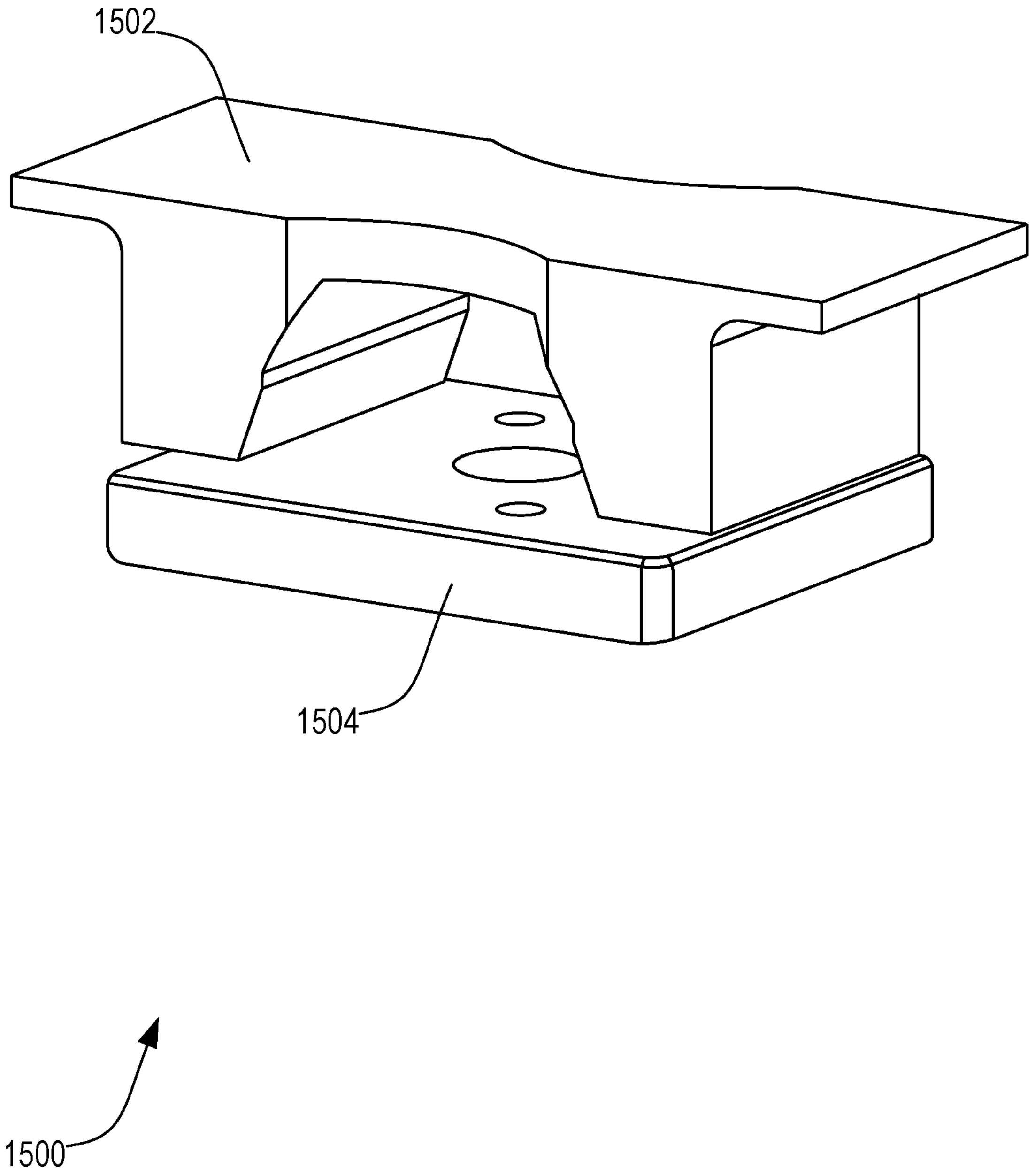
FIG. 15 is a diagram illustrating a chamfered yoke variation of a magnetic yoke assembly for electromechanical contactors and relays according to at least one embodiment of the present disclosure.

FIG. 15 shows a chamfered yoke 1500 variation according to some embodiments of the present disclosure. The chamfered yoke 1500 includes a chamfered upper yoke 1502 and a lower yoke 1504. As shown, the lower yoke 1504 includes one or more openings to allow passage of other components, such as a plunger shaft 1104. Both the chamfered upper yoke 1502 and the lower yoke 1504 are ferromagnetic as can be appreciated.

Figure 16:
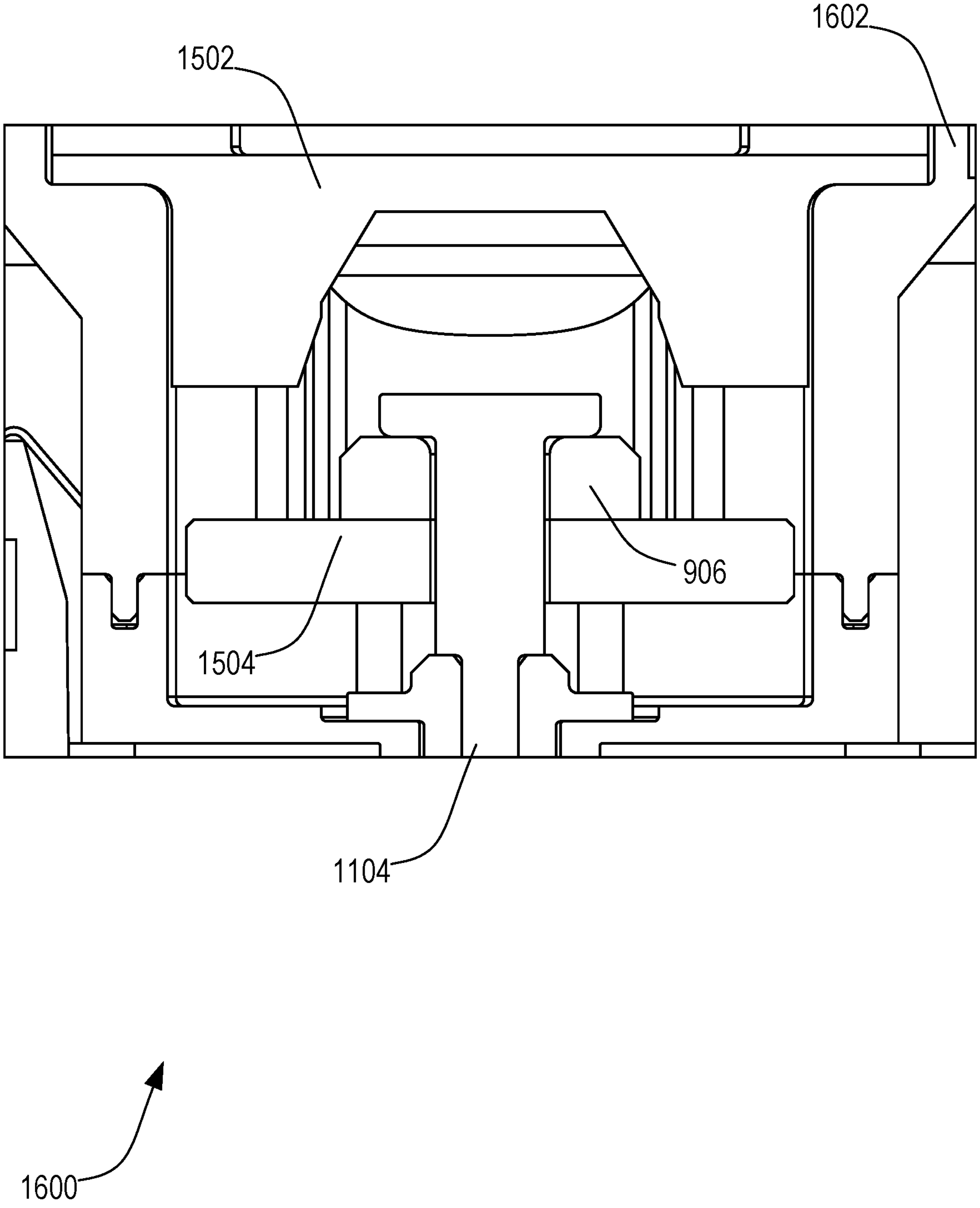
FIG. 16 is a cross-sectional view of an example electromechanical contactor with a magnetic yoke assembly according to at least one embodiment of the present disclosure.
Figure 17:
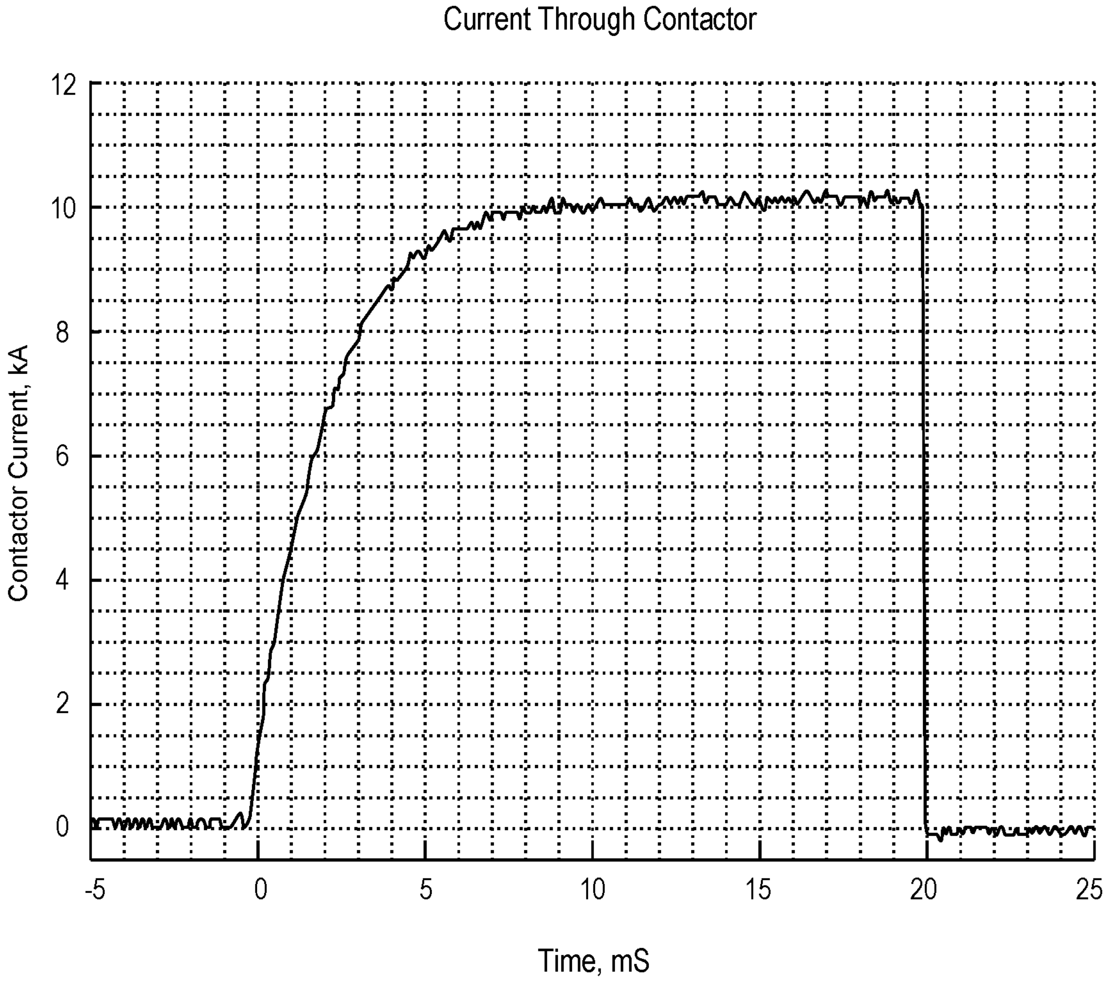
FIG. 17 is a graph of data from a short-circuit test using a chamfered yoke variation of a magnetic yoke assembly according to at least one embodiment of the present disclosure.

FIG. 16 shows a cross-sectional view of a contactor 1600 with a chamfered yoke 1500. In the example contactor 1600, the chamfered upper yoke 1502 is supported by an arc envelope 1602. A moveable contact 1002 rests on the lower yoke 1504. A plunger shaft 1104 passes through the openings in the lower yoke 1504 and the moveable contact 906. The chamfered upper yoke 1502 allows additional ferromagnetic mass, increasing the anti-levitation force, without interfering with actuator movement. FIG. 17 shows data from a 10 kA, 20 ms short-circuit test using a chamfered yoke design according to some embodiments of the present disclosure. Current is successfully passed through contactor using the chamfered yoke design.

Figure 18:
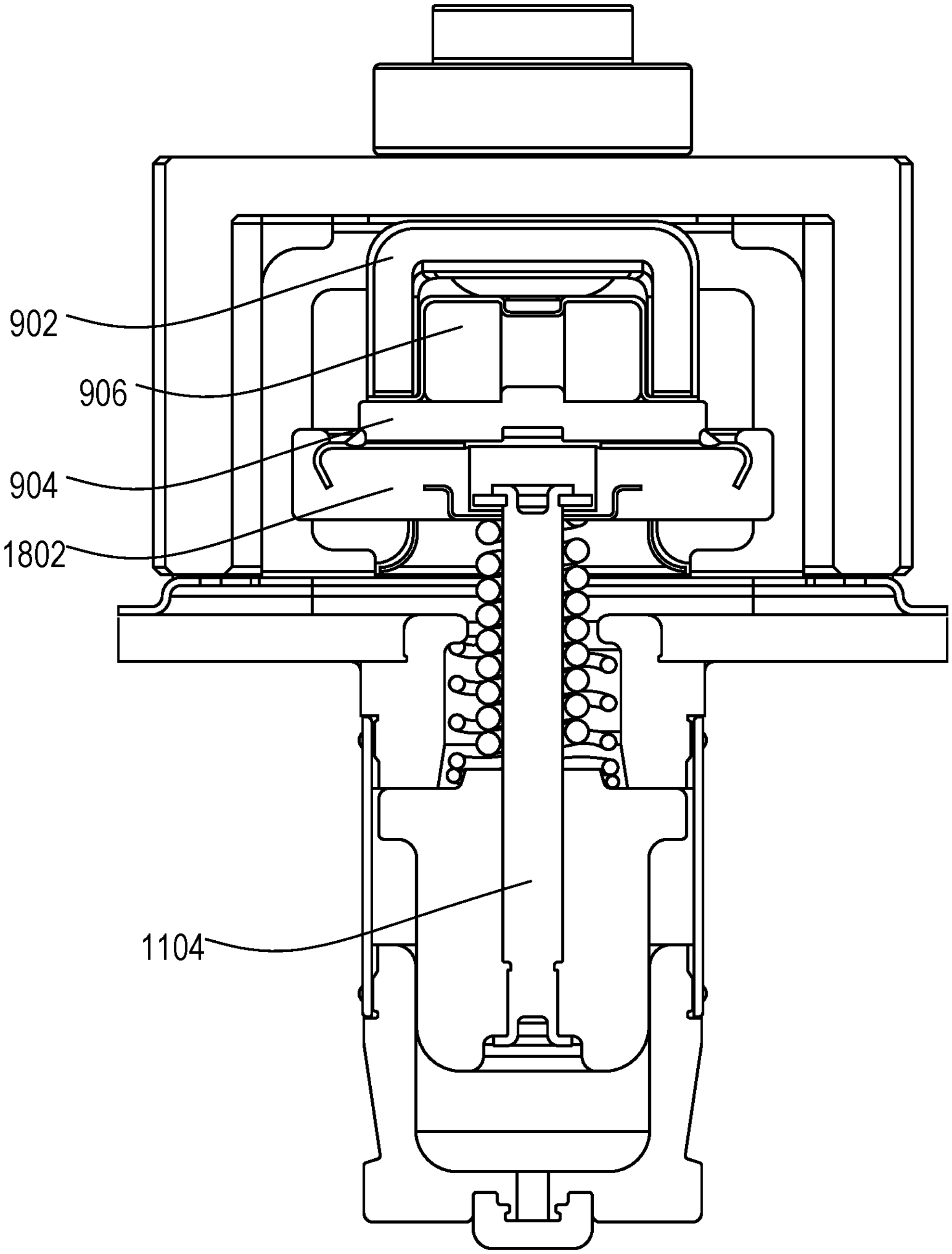
FIG. 18 is a diagram illustrating a cross-sectional view of an electromechanical contactor that includes a chamfered yoke variation of a magnetic yoke assembly according to at least one embodiment of the present disclosure.

FIG. 18 shows a design variation of a contactor 1800 including an over-molded component 1802 in the actuator that isolates the high-voltage current carry circuit from the low-voltage coil circuit according to some embodiments of the present disclosure. As shown, the over-molded component 1802 is coupled to a plunger shaft 1104 of an actuator. The ferromagnetic lower yoke 904 sits atop the over-molded component 1802, with the moveable contact 1002 sitting on the ferromagnetic lower yoke 904. The ferromagnetic upper yoke 902 and the ferromagnetic lower yoke 904 frame or encircle the moveable contact 1002.

Figure 19:
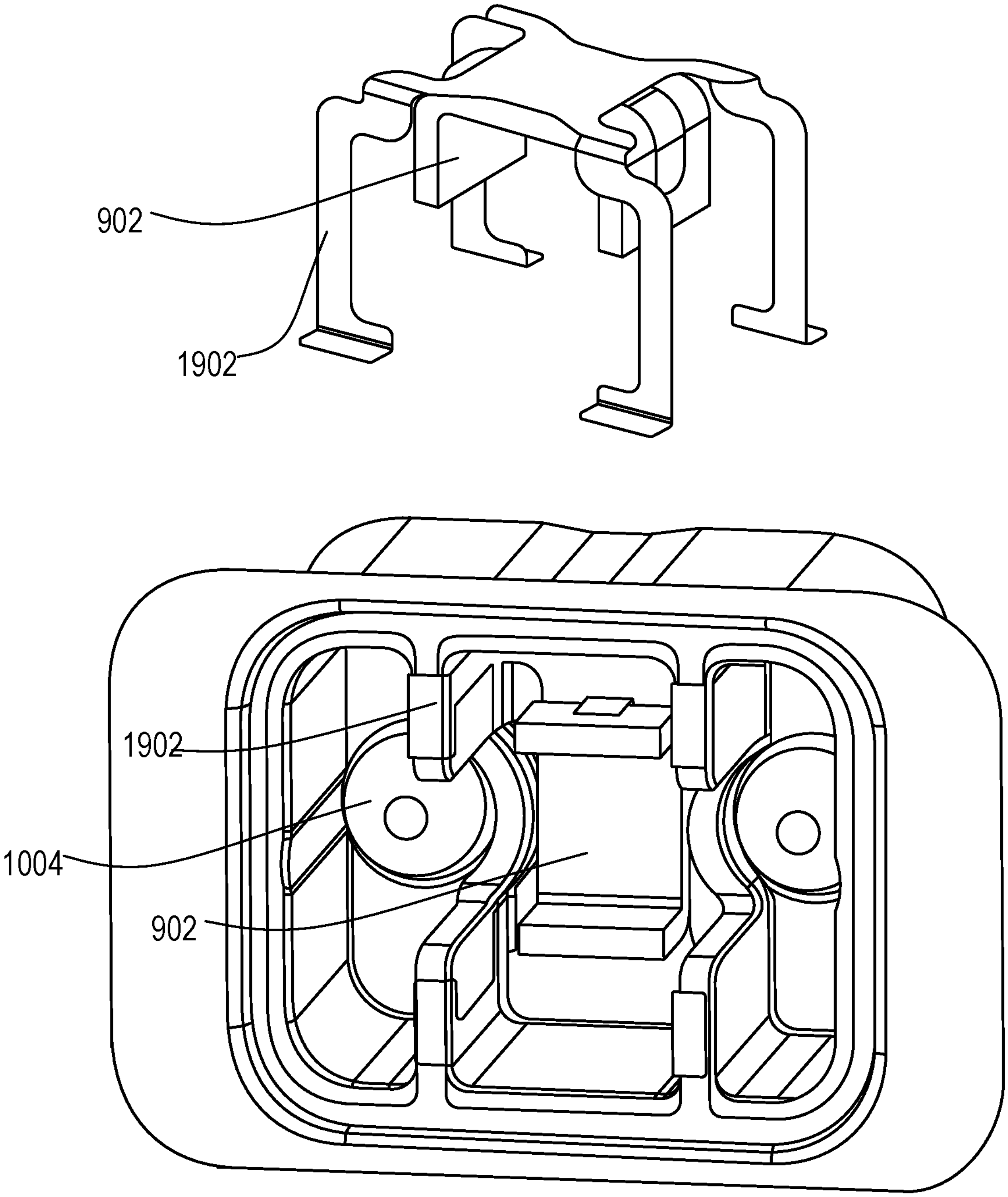
FIG. 19 is a diagram of a cage component of an electromechanical contactor that includes a magnetic yoke assembly with a chamfered yoke variation according to at least one embodiment of the present disclosure.

FIG. 19 shows a cage component 1902 used to attach the ferromagnetic upper yoke 902 to the arc envelope 1602 according to some embodiments of the present disclosure. The cage component 1902 is coupled to the arc envelope 1602 and holds the ferromagnetic upper yoke 902 in place. As shown, the arc envelope 1602 includes openings for terminals 1004 that can contact a moveable contact 1002 after assembly.

Figure 20:
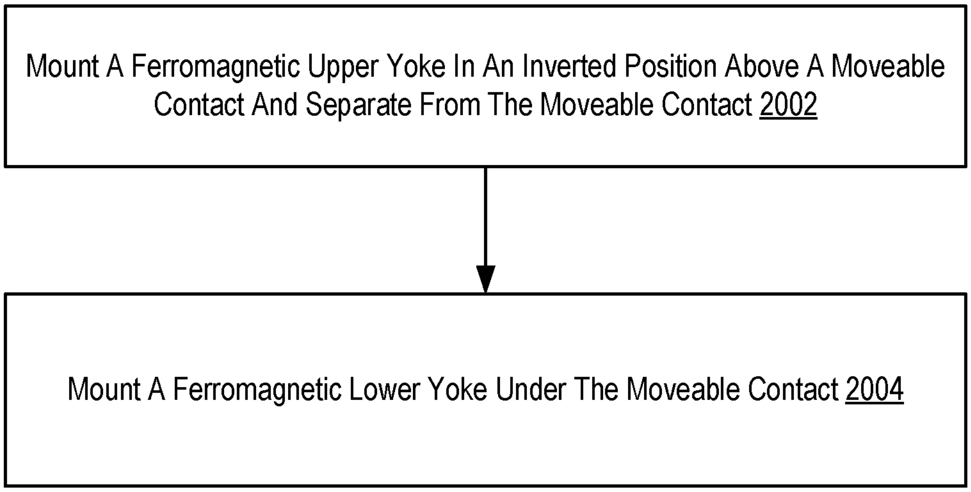
FIG. 20 is a flowchart of an example method of manufacture for a magnetic yoke assembly for electromechanical contactors and relays according to at least one embodiment of the present disclosure.

FIG. 20 shows a flowchart of an example method of manufacture for a contactor having a magnetic yoke for improved switching performance in electromechanical contactors and relays according to some embodiments of the present disclosure. The method of FIG. 20 includes mounting 2002 a ferromagnetic upper yoke 902 in an inverted position above a moveable contact 1002 and separate from the moveable contact. In some embodiments, mounting 2002 the ferromagnetic upper yoke 902 includes supporting the ferromagnetic upper yoke 902 by an arc envelope 1602 such as a ceramic arc envelope 1602. In some embodiments, mounting 2002 the ferromagnetic upper yoke 902 includes coupling or attaching the ferromagnetic upper yoke 902 to a cage component 1902 that is coupled to the arc envelope 1602. The ferromagnetic upper yoke 902 is mounted above and separate from the moveable contact 1002 such that there is no direct physical coupling between the ferromagnetic upper yoke 902 and the moveable contact 1002.

The method of FIG. 20 also includes mounting 2004 a ferromagnetic lower yoke 904 under the moveable contact 1002. Thus, the movable contact 1002 sits on or is attached to the ferromagnetic lower yoke 904. In some embodiments, the ferromagnetic lower yoke 904 is attached or coupled to an actuator. In some embodiments, the ferromagnetic upper yoke 902 and ferromagnetic upper yoke 904 are mounted inside a chamber that is hermetically sealed.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A component assembly including a magnetic yoke assembly for electromechanical contactors and relays, the magnetic yoke assembly including:

- a moveable contact having a first side and a second side, the first side configured for contacting a plurality of terminals, wherein the second side is opposite to the first side;
- a ferromagnetic upper yoke that is disconnected and separate from the moveable contact and is in a fixed position between the plurality of terminals and adjacent to and above the first side of the moveable contact, wherein the ferromagnetic upper yoke comprises a u-shaped yoke; wherein the ferromagnetic upper yoke includes flange portions;
- a ferromagnetic lower yoke mounted to the second side of the moveable contact;
- an actuator assembly including a plunger shaft operable to move the ferromagnetic lower yoke and moveable contact, the plunger shaft having a standoff, wherein a spring is situated between the standoff and the ferromagnetic lower yoke and in direct contact with the ferromagnetic lower yoke; and
- an arc envelope having a shelf that supports the ferromagnetic upper yoke, wherein the flange portions of the ferromagnetic upper yoke are seated on and supported by the shelf of the arc envelope.

2. The component assembly of claim 1, further comprising the plurality of terminals.

3. The component assembly of claim 1, further comprising a cage component coupled to the arc envelope, wherein the ferromagnetic upper yoke is coupled to the cage component.

4. The component assembly of claim 1, wherein the arc envelope comprises a ceramic arc envelope.

5. The component assembly of claim 1, wherein the ferromagnetic upper yoke comprises a chamfered yoke.

6. The component assembly of claim 1, further comprising an over- molded component isolating a high-voltage current carry circuit from a low-voltage coil circuit.

7. The component assembly of claim 6, wherein the ferromagnetic lower yoke is coupled to the over-molded component.

8. The component assembly of claim 1, further comprising an actuator, wherein the ferromagnetic lower yoke is attached to the actuator.

9. The component assembly of claim 8, wherein the moveable contact comprises an opening and wherein a plunger shaft of the actuator passes through the opening.

10. The component assembly of claim 1, further comprising a hermetically sealed chamber housing the magnetic yoke assembly.

11. The component assembly of claim 1, wherein the ferromagnetic lower yoke comprises a flat yoke.

12. The component assembly of claim 1, wherein the ferromagnetic lower yoke comprises an opening; and wherein a plunger shaft of an actuator passes through the opening.

13. The component assembly of claim 1, wherein the plunger shaft includes a first portion having a first diameter and a second portion having a second diameter, the first diameter larger than the second diameter, and wherein the second portion passes through an opening in the standoff, the first diameter of the first portion being larger than the opening in the standoff.

* * * * *